United States Patent [19]

Andrews et al.

[11] 4,449,195

[45] May 15, 1984

[54] DIGITAL FLUOROGRAPHIC PROCESSOR CONTROL

[75] Inventors: Edward W. Andrews, Brookfield; John E. Celek, Oconomowoc; Royal R. Morse, III, Wales; Eugene W. Bergholz, Dousman, all of Wis.

[73] Assignee: General Electric Company, Schenectady, N.Y.

[21] Appl. No.: 321,307

[22] Filed: Nov. 13, 1981

[51] Int. Cl.³ .......................... G06F 9/40; G06F 3/14
[52] U.S. Cl. ..................................... 364/900; 358/111
[58] Field of Search ... 364/200 MS File, 900 MS File; 378/99, 111, 149, 190; 358/111

[56] References Cited

U.S. PATENT DOCUMENTS

| | | | |
|---|---|---|---|
| 3,508,539 | 4/1970 | Mahoney et al. | 378/190 |
| 3,860,817 | 1/1975 | Carmean | 378/190 |
| 4,188,537 | 2/1980 | Franke | 378/99 |
| 4,205,387 | 5/1980 | Ovshinsky et al. | 364/900 |
| 4,355,331 | 10/1982 | Georges et al. | 378/99 |
| 4,367,490 | 1/1983 | Riederer | 378/99 |
| 4,375,068 | 2/1983 | McBride | 378/99 |
| 4,380,818 | 4/1983 | Pfeiler | 378/99 |
| 4,393,402 | 7/1983 | Keyes et al. | 378/99 |

*Primary Examiner*—Joseph F. Ruggiero
*Assistant Examiner*—Gary V. Harkcom
*Attorney, Agent, or Firm*—Fuller, House & Hohenfeldt

[57] ABSTRACT

A method of controlling a digital video processor in a digital fluorography system wherein the electronic components of the processor are variously configured to perform math functions and manipulations on digital image data obtained in connection with carrying out x-ray examination procedures and the images are displayed on a television monitor or recorded. A system controller sends a complete recipe for a procedure to the memory of a microprocessor based CPU that controls the video processor. The latter CPU interprets the instructions and effects configurations and reconfigurations in the data paths of the video processor during television vertical blanking intervals.

4 Claims, 4 Drawing Figures

DIGITAL FLUOROGRAPHIC PROCESSOR CONTROL

BACKGROUND OF THE INVENTION

This invention relates to a method and means for configuring and controlling a plurality of functional devices in a multi-function system such as digital memory, multiplexer, arithmetic logic, multiplier, video camera, disk recorder and x-ray devices in a digital fluorography video disk processor system.

An important use of digital fluorography is in making x-ray arteriographic studies. One procedure invloves making a digital representation of an x-ray image, called a mask image, of the blood vessels in an anatomical region of interest at a time when no x-ray opaque medium is entrained in the blood that is flowing through the vessels. The opaque medium is typically an iodine compound solution. Then, when the blood in which the opaque medium has been injected intravenously reaches the region of interest, one or more successive x-ray images are obtained and digitized. One of the images in the series that exhibits the greatest concentration of x-ray opaque medium has the mask image subtracted from it. The mask image usually contains data representative of the blood vessels, other soft tissue and bone. Any subsequent image will contain data corresponding to blood vessels, other soft tissue, bone and iodine. The digital data for the two images are scaled in such fashion that when the subsequent image is subtracted from the mask image, bone and soft tissue substantially cancel each other and the blood containing the x-ray opaque medium remains to define the outline of the blood vessels without the presence of obscuring background information. Customarily, the mask image is stored in one digital full-frame memory and the subsequent images are delivered to another memory. Processing of the data, that is, doing such things as scaling and multiplying, dividing or offsetting it and multiplexing it to one or more video display devices is carried on in the digital video processor (DVP).

Besides carrying out the simple mask subtraction procedure just outlined, the digital video processor is required to perform many other functions for different medical procedures. For instance, some procedures involve multiple subtractions of images and others, by way of further example, require integrating a succession of images and then performing a subtraction. The data flow paths through the digital video processor are necessarily different for the various procedures. The data flow paths are through such functional devices as multiplexers, multipliers, one or more arithmetic logic units (ALU) and look-up tables, for instance. The data flow paths often have to be reconfigured for every image frame, that is, in coordination with the x-ray image acquisition rate. A common approach to reconfiguring the DVP data paths is to use a microprocessor in a conventional manner. The instructions for reconfiguring have been traditionally stored in a read-only memory (ROM). When the microprocessor was instructed to carry out a particular procedure, it fetched the instructions from ROM and executed them in sequence to thereby produce addresses and data for setting up the various functional devices and, hence, data paths in the DVP. If, after the equipment was installed, the user desired to perform some fluorographic procedure which was not programmed in ROM, it became necessary to remove the ROMS from circuitboards, reprogram them and replace them. This is costly if not completely impractical. Thus, programming of procedures in ROM reduces the flexibility of the DVP.

SUMMARY OF THE INVENTION

In accordance with the invention, a digital video processor central processor unit (DVP-CPU) is used to control the digital video processor. The DVP-CPU does not step through a ROM-based program to reconfigure the data paths through the video processor, but, instead, it functions primarily as a synchronizer and high level command interpreter. A procedure which the user desires to execute is entered into a host CPU system controller by way of the keyboard of a cathode ray tube terminal. The software of the host CPU then develops what is herein called a recipe for a whole procedure which recipe is delivered to a random-access memory (RAM) associated with the DVP-CPU. The recipe is delivered prior to the x-ray and image processing procedure. When the recipe is ready to be run, the DVP-CPU is given an appropriate instruction by the host CPU. The DVP-CPU then interprets the recipe in RAM and repeatedly reconfigures the DVP data paths on a video frame-by-frame basis. Reconfiguration occurs during the vertical blanking interval of the video camera that acquires the converted x-ray images. In other words, all configuration commands executed by the DVP-CPU are keyed off of the video camera timing when a recipe is being executed.

The new method and apparatus for controlling a versatile multi-function digital system will now be described in greater detail in reference to the drawings.

DESCRIPTION OF A PREFERRED EMBODIMENT

Figure 1A:
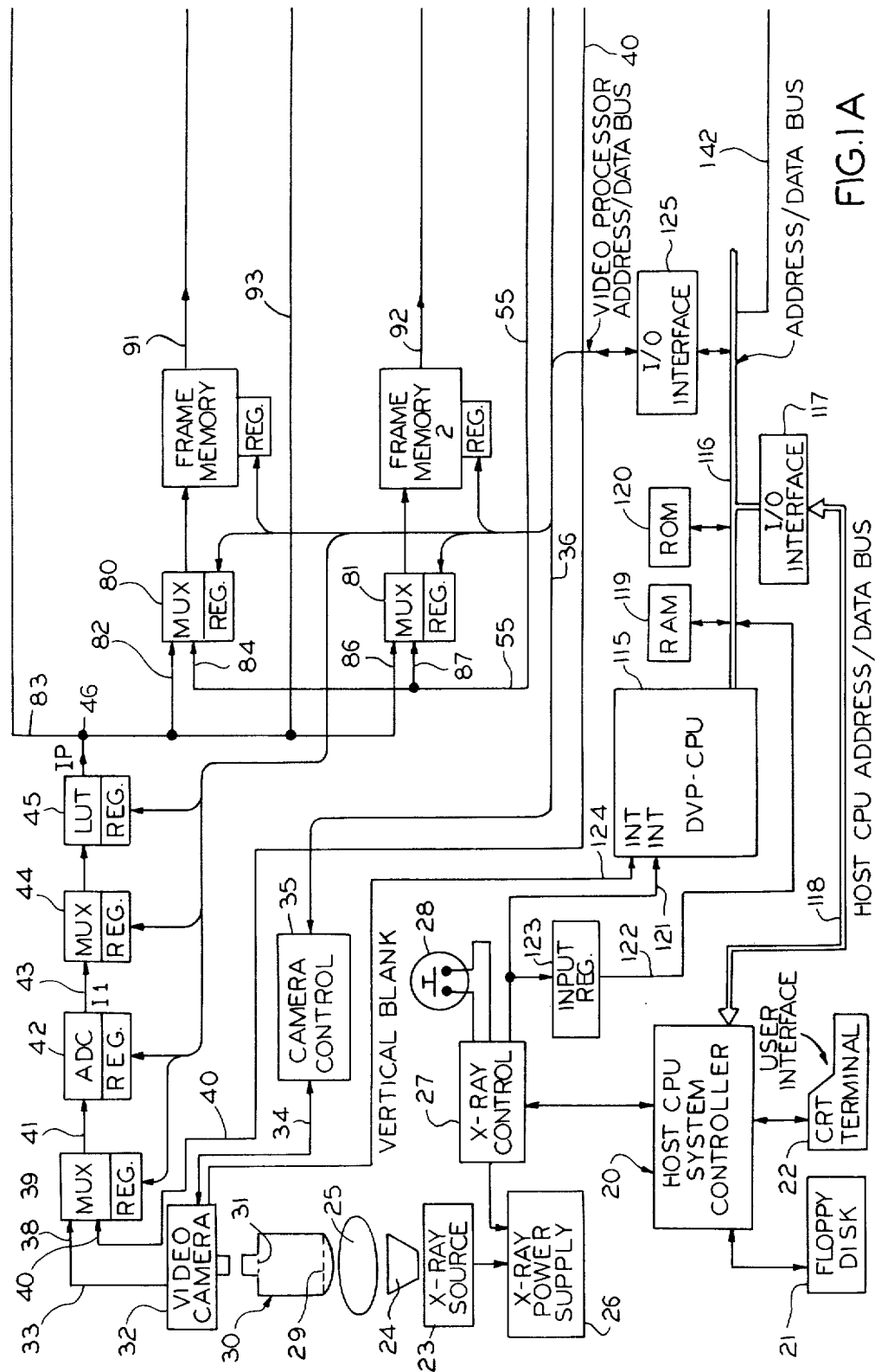
FIGS. 1A and 1B together comprise a block diagram of the essential components of an x-ray system and a digital video processor for performing digital fluorography.

The x-ray apparatus and a host CPU for exercising general control of the system appears in the left region of FIG. 1A. The host CPU system controller is represented by the block marked 20. Its software may be stored on floppy disk which is symbolized by block 21. A CRT terminal 22 is the user interface for communicating with the system. In accordance with the invention, if the radiologist user desires to perform a particular fluorographic procedure he or she is simply obliged to have the identification for the procedure fed by way of the CRT terminal 22 keyboard to the host CPU 20. The host CPU then assembles the instructions for the procedure and events occur as will be more fully explained later. For the present, by way of example, the user may want to perform a procedure where a mask image is obtained followed by an image or series of images wherein an x-ray opaque medium in the blood vessels appears in the view and the latter image or images are to have the mask image subtracted from it or them. It may be desired to display the second sequence of images following the mask on a video monitor as they are being obtained so the user can select the one from which the mask should preferably be subtracted to obtain the greatest image contrast. The host CPU will provide the recipe for doing this if it is desired. A digital video processor CPU (DVP-CPU), to be discussed later, will cause the digital video processor electronic components to be functionally reconfigured as required to execute the recipe.

The x-ray system in the left region of FIG. 1A comprises an x-ray source or tube 23 which has a collimator 24 for defining the size of the x-ray field or beam that is projected through a patient who is represented by the ellipse 25.

The components of an x-ray tube power supply are collectively represented by block 26 which is coupled to the x-ray source 23. The power supply may be conventional in that it applies a high voltage between the anode and cathode of an x-ray tube during an x-ray exposure and also establishes the filament current that is required to produce an electron beam in the x-ray tube which yields the desired x-ray intensity during an exposure. In some procedures, the x-ray power supply may be controlled to cause the x-ray source to project a high photon energy and low intensity beam through the patient 25 for some images and a lower voltage and higher intensity beam through the patient for other images. This is achieved with an x-ray control system represented by the block marked 27. The x-ray control is set up to provide x-ray beams of approximate energy and intensity by control instructions received from host CPU 20, which instructions have been formatted by the host CPU in response to user commands entered with CRT terminal 22. X-ray exposure sequences may be initiated by the traditional foot switch or hand switch. A typical switch is shown schematically and is marked 28. Closing switch 28 may initiate an x-ray exposure sequence provided other conditions are met as will be explained later. Once the host CPU 20 sets up a procedure in response to instructions through user interface 22, the user can, at any time that conditions are right, close hand switch 28 and the procedure will run.

Whenever x-ray source 23 is energized, it projects a beam through patient 25 to produce an x-ray image which is received on a photocathode screen 29 in an x-ray image intensifier tube 30. As is well known, photocathode 29 converts the x-ray image to an electron image which is focused to produce a corresponding bright and minified optical image on the output phosphor 31 of the intensifier. The optical version of the x-ray image is viewed with a television or video camera 32. When the target of the tube in video camera 32 is scanned, line after line of analog video waveforms are output on a cable 33. Video camera 32 is coupled by means of a cable 34 to a video camera control module represented by the block marked 35. Control module 35 has the capability for controlling the video camera 32 to read out its tube target in either the progressive scan mode or the interlaced scan mode. Camera control 35 is coupled onto the digital video processor address/data bus which is generally designated by the numeral 36 and couples to several other devices in the digital video processor which will be more completely discussed later.

Figure 1B:
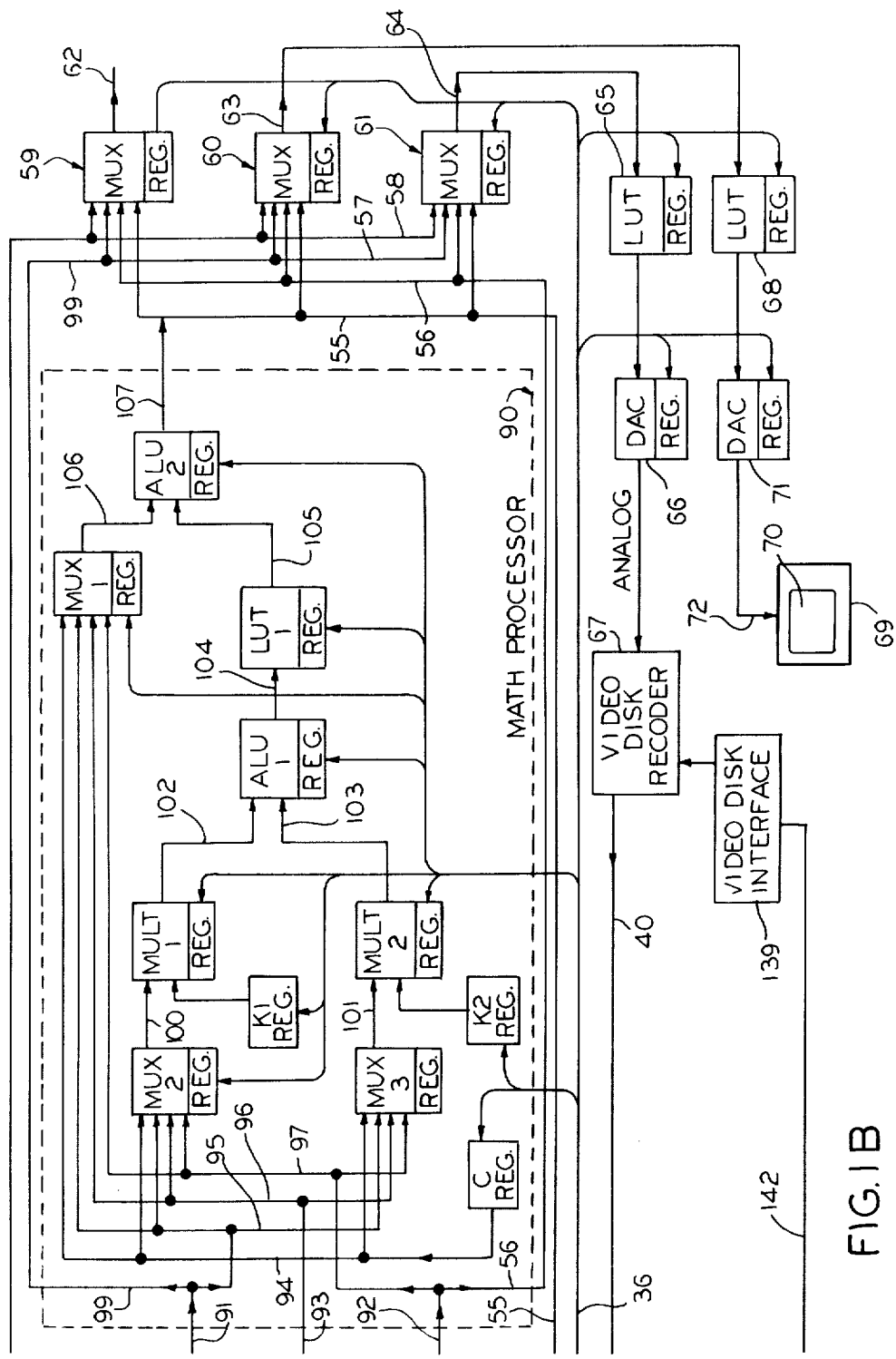

The analog video signals from video camera 32 are fed by way of cable 33 to one input 38 of an analog multiplexer (MUX) 39. MUX 39 has another input 40 for another analog video signal that is provided from a video recorder as will be discussed later and need not be considered at this time. MUX 39 then has a register associated with it and labelled REG. This register is coupled to the DVP address/data bus 36. The register associated with MUX 39 is provided with an appropriate digital code word to set up the MUX for transmitting the analog video signals on inputs 38 or 40, as the case may be, to its output 41. Output from MUX 39 is input to an analog-to-digital converter (ADC) represented by the block marked 42. ADC 42 samples the incoming analog waveforms and converts the samples to corresponding digital values which represent the intensities of the picture elements (pixels) that compose the x-ray image. In this example, ADC 42 may be considered to quantify or digitize over a 10-bit range of decimal 1024. Thus, there is a 10-bit bus 43 coupling the output of ADC 42 to the input MUX 44 of the digital video processor that follows this MUX. MUX 44 also has an associated register that is coupled to DVP address/data bus 36. Inspection of FIGS. 1A and 1B will reveal that many of the devices in the digital video processor have registers associated with them for making them subject to control with digital code words supplied and returned to bidirectional DVP address/data bus 36.

The digital pixel data that is output from MUX 44 is input to a look-up table (LUT) 45 in the input stage of the DVP. LUT 45 has an associated register as indicated in the drawings. LUT 45 is customarily loaded with a look-up table that converts the linear digital data output from MUX 44 to corresponding logarithmic values, for reasons known to those skilled in the x-ray art, which logarithmic values are fed to the input data bus junction 46 of the DVP.

At this time it may be noted that in some digital fluorographic systems, two video cameras, such as the one marked 32, are used. A transmissive and reflective mirror, not shown, is interposed between the image intensifier and the two cameras for directing images to both cameras at the same time. The image resulting from a high x-ray photon energy beam is read out from one video camera while the other is blanked and the image resulting from the next succeeding low x-ray photon energy beam is read out from the other camera while the one is blanked. MUX 39 has an additional input, not shown, for the additional camera analog signals so they can be passed on to the ADC 42 for conversion.

Thus far, the description has demonstrated how digitized data representative of x-ray image frames is produced and provided to bus junction 46 of the image processor which will be described in more detail later. It should be recognized that the video processor is adapted to process the digital pixel data in a variety of ways for various imaging procedures, some of which may not have even been conceived as yet. Typically, the processor can be set up to do such things as subtract a mask image that contains soft tissue, bone and blood vessels that do not contain an x-ray opaque medium from a single image or a series of integrated images that do contain soft tissue, bone and blood vessels through which blood-entraining x-ray opaque medium is beginning to flow or has been flowing. This is called temporal subtraction. The video processor in such cases would weight or scale the data for one or both of the images and subtract the images in a manner that results in the soft tissue and bone being cancelled and in the blood vessels containing the opaque medium remaining to be visualized. The data resulting from the scaling and subtraction processes in the digital video processor is then reconverted to analog video signals in most cases for being displayed on a television monitor. The video processor also has the capability of performing multiple subtractions as required in the hybrid subtraction process exemplified in the abandoned application of Keyes, et al Ser. No. 321,007; filed on Nov. 13, 1981 said application is assigned to the assignee of this application. In temporal subtraction, it is often possible to achieve good cancellation or subtraction of bony structures but many artifacts resulting from involuntary patient movement such as that due to swallowing, breathing, peristalsis and blood vessel expansion and contraction induce motion in the soft tissues principally. In another method called hybrid or multiple subtraction, a combination of different x-ray energy and temporal subtraction techniques are used. In hybrid subtraction, x-ray images are obtained at two different x-ray tube kilovoltages and are combined in a manner to suppress signals due to variations in thickness of any one component in a heterogeneous object such as the body. A temporal or mask image is obtained by projecting a low average energy x-ray beam through the body followed by a high average energy x-ray beam. The attenuation data for one or the other of the pairs of images are weighted and these data are subtracted to effect cancellation of soft tissue. Thus, images consisting primarily of bone and soft tissue acquired at the two kilovoltages are scaled, using appropriate constants, and then subtracted to produce a mask image in which signals due to tissue variations are suppressed, leaving only bony structures. The data for a pair of high and low energy x-ray images are next obtained when the intravenously injected x-ray opaque medium reaches the vessels in the region of interest. The data for their pair of images is acted upon by the same constant weighting factors that were used with the first pair of images and one image in this pair is subtracted from the other such that the resulting post-injection image contains data representative of the bone structures plus vessels containing an x-ray opaque medium such as iodinated compound. The final step in hybrid subtraction is to subtract the dual kilovoltage mask image from the dual kilovoltage post-injection image to thereby suppress or cancel the bone structures and isolate the iodinated vessels. A major advantage of the hybrid system over temporal subtraction alone is the reduced sensitivity to soft tissue motion artifacts because the soft tissue is suppressed or cancelled in both dual energy images.

The foregoing are just some examples of the processes which the DVP is required to perform. It will be evident that the data paths to and from and including the various functional components of the DVP such as multiplexers, multipliers, arithmetic logic units and memories will have to be reconfigured before and after each successive x-ray image frame without allowing any unintended overlapping or loss of image data to occur.

Before describing the new digital fluorographic processor control system in detail, consideration will be given to what is output from the system. Attention is invited to the far right region of FIG. 1B. There are four 12-bit buses 55, 56, 57 and 58 for variously routing image data in the controller and for permitting output of image data to various destinations. In this embodiment, there are three 4-input multiplexers 59, 60 and 61 each of which has its inputs connected to buses 55–58. Each MUX 59–61 has a register, labelled REG for receiving digital control words and addresses that determine which of the buses 55–58 will be coupled to the respective output buses 62, 63 and 64 of the MUXes. By way of example, output bus 64 from MUX 61 is coupled to the input of LUT 65 which also has a register coupled to the address/data bus 36 of the digital video processor. The digital pixel data output from LUT 65 is input to a digital-to-analog converter (DAC) 66 that is also represented as having a register, REG. The analog video signal output from DAC 66 is input to a video disk recorder symbolized by the block marked 67. Upon demand, video disk recorder 67 will output stored analog image data by way of a cable 40 which, as previously mentioned, couples to one of the inputs of MUX 39 adjacent video camera 32 in FIG. 1A. Thus, image data from the video disk recorder can be optionally returned to the processor for further processing or simply sent through the processor and outputted by MUX 60 for display on a television monitor. Output MUX 60 is, for example, coupled by way of its output bus 63 to a digital look-up table, LUT 68 which has a register, REG, associated with it. LUT 68 may, for instance, be loaded with a look-up table for adjusting the gray scale of the image data so the data will occupy the full dynamic range of a television monitor 69 on whose screen 70 images are displayed. A DAC 71 is interposed between LUT 68 and the television monitor for converting the digital image data to analog video signals that are supplied to television monitor 69 by way of a cable 72.

Output MUX 59 of the DVP does not have its output bus 62 connected to anything as illustrated. Bus 62 could, for example, lead to the interface of a digital storage device, not shown. It will be evident that by having the two output MUXes 60 and 61 from the DVP available, data representative of a mask image might be displayed on one television monitor such as monitor 69 while images resulting from subtraction might be displayed on another monitor, now shown, simultaneously. Moreover, image data in any form can also be recorded on video disk or other recorder simultaneously or separately by appropriate control of multiplexers 59, 60 and 61.

The functional components of the digital video processor will now be identified. Four components shown next to video camera 32 and mentioned earlier can be considered collectively as being an input processor (IP). These components are MUX 39, ADC 42, MUX 44 and LUT 45. As previously mentioned, the output of LUT 45 couples to bus junction 46 so that this junction is an input from the IP.

The illustrated digital processor includes two multiplexers 80 and 81. MUX 80 has an input 82 coupled to IP junction 46 and to a wraparound bus 83 so pixel data can be fed directly to any of the output MUXes 59–61 if desired. MUX 80 has another input bus 84 that couples to another wraparound bus 55. Similarly, the other MUX 81 has inputs 86 and 87 that couple to the same buses or sources as does MUX 80. MUXes 80 and 81 have registers that are coupled to the address/data bus 36 of the digital video processor.

The output bus from input MUX 80 is coupled to a full frame memory 1 (FM1). IN an actual embodiment, by way of illustration and not limitation, FM1 has the capacity for storing an array of 512×512 digital pixel values of 12-bit depth which values comprise a video camera frame. FM1 has a register for controlling it coupled to the address/data bus of the processor. The output from the other input MUX 81 is coupled to FM2 which is similar to FM1 and also has a register coupled to the DVP address/data bus 36.

The components that comprise the math processor of the DVP are enclosed within the dashed line rectangle labelled "math processor" and further identified by the reference numeral 90. At the left of the rectangle one may see that the math processor has three inputs, one marked 91 from FM1, another 92 from FM2 and another 93 that comes directly from the image processor, IP.

The components of math processor 90 will now be identified generally. The math processor includes three digital multiplexers labelled MUX 1, MUX 2 and MUX 3. Each of the MUXes has four inputs which are connected, respectively, to buses 94, 95, 96 and 97. Bus 97 connects to the feedback bus 56 and to output 92 of FM2. Bus 95 connects to another feedback bus 99 and to output 91 of FM1. Bus 96 connects to another feedback bus 93. Bus 94 is for introducing a constant, C, to an input of each of the multiplexers, MUX 1, MUX 2 and MUX 3. Bus 94 is shown as being coupled to a register, symbolized by the block labelled C REG. The register is coupled to the address/data bus 36 of the digital video processor. MUXes 1, 2 and 3 can be switched to let the constant, C, pass through them as required for certain arithmetic operations such as when it is desired to add or subtract the constant C to pixel data for the purpose of offsetting the data. MUX 2 and MUX 3 each have registers coupled to the DVP address/data bus 36.

The outputs 100 and 101 from MUXes 2 and 3 are inputs to multipliers 1 and 2 labelled MULT 1 and MULT 2, respectively. Registers are provided for coupling multiplier constants K1 and K2 into one input of the respective MULTs 1 and 2. These registers for introducing the multiplication values are labelled K1 REG and K2 REG. They are of, course, coupled to address/data bus 36 of the DVP.

The outputs from MULT 1 and MULT 2 are input by way of buses 102 and 103 to an arithmetic logic unit labelled ALU 1. This unit has a register coupled to address/data bus 36. ALU 1 has the capability of performing various arithmetic and logic functions that are required for the various image data processing steps required of the system. The output 104 of ALU 1 is input to a look-up table represented by the block labelled LUT 1. LUT 1 has a register coupled to DVP address/data bus 36. LUT 1 can be loaded with various tables that perform a transfer function on data output from ALU 1. LUT 1 can be controlled by signal from address/data bus 36 to simply let data from ALU 1 pass through without altering it.

The output 105 from LUT 1 is one input to another arithmetic logic unit labelled ALU 2. ALU 2 also has another input 106 from MUX 1. The output from ALU 2 and, hence, math processor 90 is marked 107. Output 107 connects to output bus 55 which leads back to input MUXes 81 and 80 and also constitutes one input to the output MUXes 59, 60 and 61. Other inputs to MUXes 59–61 are from a bus 99 which leads back to FM 1 as previously described. Another common input to MUXes 59–61 is from bus 56 which leads back to the output of FM 2.

As indicated earlier, the video digital processor whose components including input MUXes 80, 81, frame memories 1 and 2 and math processor 90, can be variously configured and conditioned to perform a large variety of operations incidental to digital fluorographic image processing. For instance, the DVP may be configured to permit real-time or live x-ray image display on one of the television monitors. In addition, the DVP can, for example, integrate the data for as many successive images as is desired and, either display the integrated image or subtract a mask image from it.

All of the components of the DVP are controlled by a microprocessor controller which is symbolized by the block marked 115 and labelled DVP-CPU. DVP-CPU 115 has its own address and data bus which is so labelled and further identified by the reference numeral 116. This bus 116 is coupled by means of an input-output interface (I/O interface) 117 to the digital video processor address/data bus 36. A bidirectional bus 118 puts the host CPU system controller 20 in an intercommunication relation with DVP-CPU 115. A RAM 119 is coupled to bus 116 and is provided for use by DVP-CPU 115. Bus 116 also has a read-only memory (ROM) 120 coupled to it. In accordance with the invention, DVP-CPU 115 is used to synchronize, activate, deactivate and otherwise control components of the DVP to reconfigure them for performing various operations that may or may not differ between successive x-ray image frames. The reference point for each reconfiguration of the DVP components coincides with the vertical blanking pulse for the TV camera 32. In other words, reconfiguration of the video processor data paths occurs only during the blanking interval of the TV camera at which time there can be no input of pixel data to the video processor.

To illustrate how the system works basically, suppose that the user desires to perform one of many arteriography diagnostic procedures that the system is capable of performing. The user simply has to instruct the host CPU 20, by way of keyboard of terminal 22, what procedure is desired. The host CPU software then causes the host CPU to assemble all of the instruction data that is to be delivered to RAM 119 to enable thwe DVP-CPU 115 to properly configure the components of the DVP to perform the procedure. By way of example, assume that the user desires to perform a procedure which involves making a mask image of the blood vessels of an organ at a time prior to arrival of the intravenously injected X-ray opaque medium in the blood vessels of interest. This is to be followed by making a sequence of subsequent images during which a view of the opaque medium flowing through the vessels is captured. In addition, four images subsequent to the mask are to be accumulated or integrated and then subtracted from the mask image. In such case, host CPU assembles all data or code words that are necessary to supply to the DVP-CPU 115 for carrying out the entire procedure. The host CPU 20 would select the code words for determining whether the video camera 30 target should be scanned or read out in the progressive scan or interlaced scan mode, for example. It would also provide the code for relating the DVP processor functions to times that the x-ray source is turned on or off. It would provide the code for effectuating reconfiguration of all of the components of the DVP between the times that output image data flows from the video camera 30. All of the necessary code for performing a procedure is then transferred to the RAM 119 of DVP-CPU 115.

The code or list of instruction words for performing a complete x-ray study procedure is called a recipe herein. Within a recipe there are a series of packets of DVP component of data path configuration operational codes and associated instruction code words which bring about reconfiguration of the DVP components in response to occurrence of respective television blanking intervals, A series of such packets will usually be present in any recipe for a procedure. A recipe run time may be initiated, for example, by the user closing the x-ray control hand switch 28 to initiate the procedure. A line 121 may provide an interrupt signal to the DVP-CPU from the x-ray control 27 to indicate when x-ray is on or off. X-ray control 27 may exercise control over the DVP-CPU by way of a bus 122 and a register 123. Another interrupt line 124 between DVP-CPU 115 and video camera 32 symbolizes providing the DVP-CPU with a signal corresponding to occurrence of vertical blanking in the video camera.

DVP-CPU 115 simply interprets the instructions in a recipe including the configuration instructions in the packets and provides instruction words to the registers associated with the multiplexers, multipliers, ALU's LUTs and other functional components so the instructions in the registers will cause their associated components to operate on image data or pass it through as is appropriate for the procedure that is being performed. The register instruction words are transmitted from the DVP-CPU by way of address/data bus 116 of DVP-CPU to the video processor address/data bus 36 through an I/O interface unit symbolized by the block marked 125.

An interpreter program is contained in ROM 120. This program permits the DVP-CPU to simply interpret the video processor configuration instruction words in RAM and send them out to the functional component registers so the components will be conditioned to perform image data manipulation and arithmetic functions as the case may be after the end of each vertical blanking interval on a frame-by-frame basis. Thus, the DVP-CPU does not do any calculations or processing of the image data. If it were obliged to do calculations and processing, output of processed image data in real time could not be achieved. During some frame times a few hundred thousand data multiplications or additions might have to be performed. If done by the DVP-CPU it would probably take minutes to do. On the other hand, the DVP components, when set up or configured during a blanking interval, can do the many thousands of arithmetic operations within a frame time or before the next video blanking interval occurs in about 33 ms.

Figure 2:
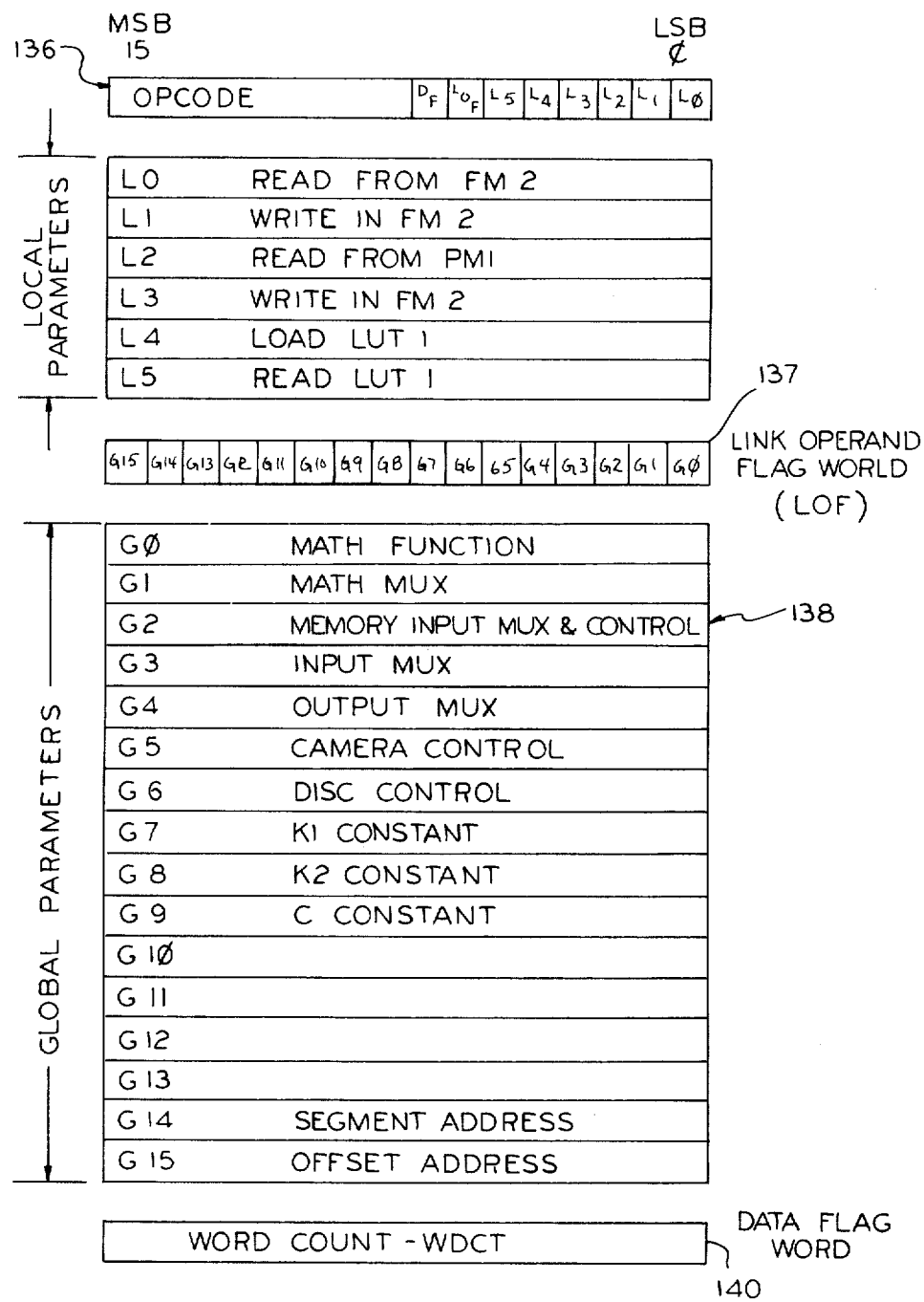
FIG. 2 illustrates and is for explaining the contents of an instruction packet within a recipe.
Figure 3:
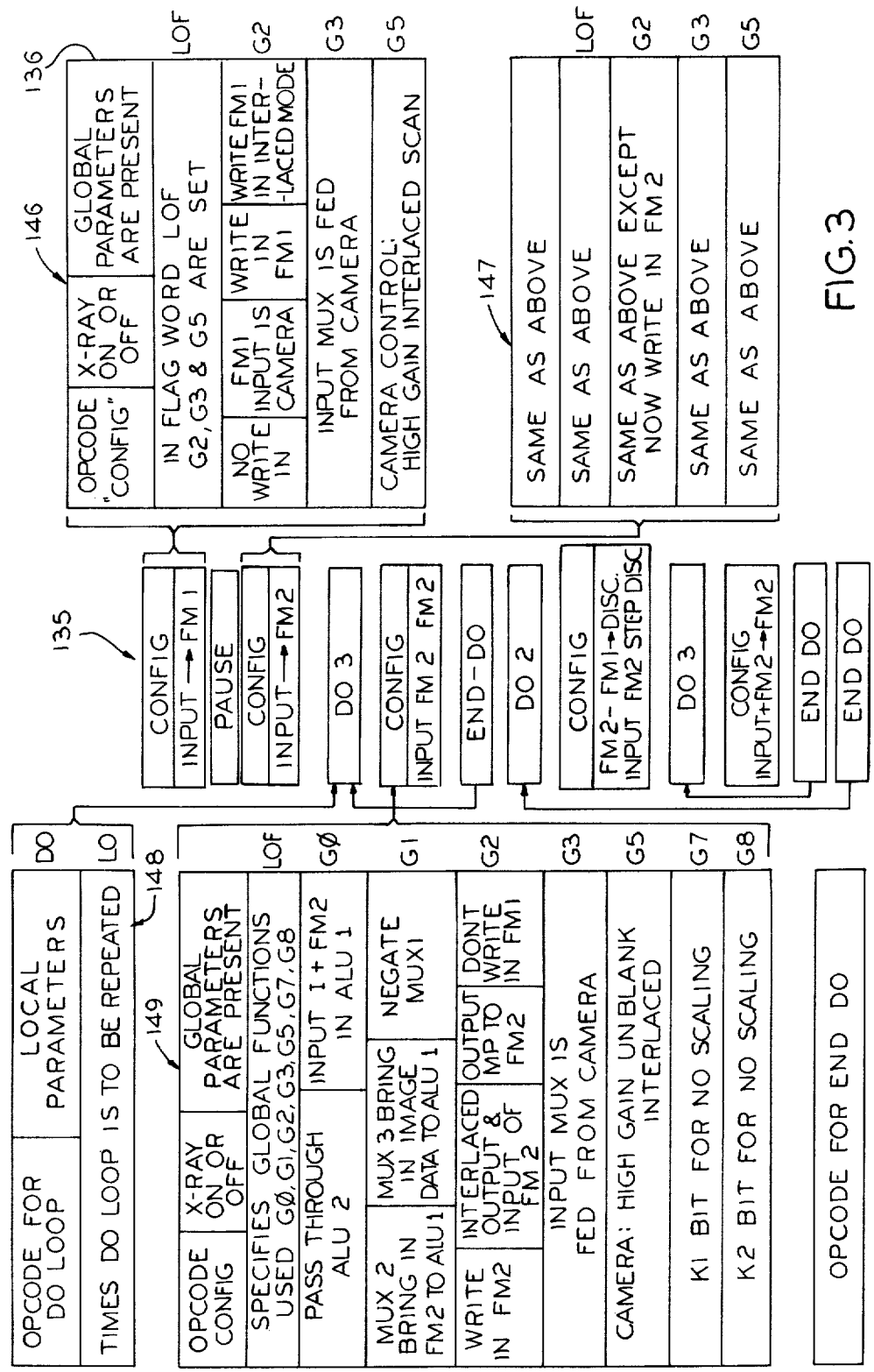
FIG. 3 illustrates and is for explaining the contents of a particular recipe among the many recipes that may be executed with the digital video processor.

The contents of an illustrative configuration instruction packet or format are illustrated in FIG. 2. A complete illustrative recipe is shown in FIG. 3 where it is represented by a stack of labelled blocks that are collectively designated by the numeral 135. The manner in which the DVP is controlled will be illustrated by explaining execution of the recipe 135 of FIG. 3. This recipe happens to be one wherein the pixel data for a mask image frame, in which the x-ray opaque iodinated medium is absent, is obtained and stored in frame memory 1 (FM 1). Following that, an image is obtained with the opaque medium entered in the blood vessels and this image is stored in FM 2. Then there more post-injection images are successively added to the image stored in FM 2 and returned to FM 2. This is followed by subtracting the image in FM 1 from the integrated image in FM 2 and storing the difference image on disk.

The contents of an instruction packet such as the several packets that are down-loaded to RAM 119 prior to running a procedure are depicted in FIG. 2. The packet contains a 16-bit word 136 which specifies what the whole ensuing block of data means and it includes an 8-bit opcode and eight control bits which are labelled L0–L5, LOF and DF. LOF stands for link operand flagword. DF is a data flag. In the format, the nature of the communication or relationship between the host CPU and the DVP-CPU is dictated by what are labelled local parameters L0–L5. Whether any of the local parameters are to be considered depends on whether any of the bits L0–L5 in the opcode word 136 are set or not set. Typical local parameters are shown in word form to illustrate some of the functions that can be performed. Of course, the opcode and these local parameters make up 16-bit digital instruction words comprised of set and unset bits as required.

It is the global parameters G0–G15 in block 138 of FIG. 2 which bring about configuration of the DVP components on a video frame-by-frame basis that is an important feature of the invention. Any global parameter G0–G15 is executed if the corresponding bit G0–G15, respectively, in the link operand flagword (LOF) is set. The LOF is identified by the numeral 137. The host CPU sets the LOF bit in the opcode word if global parameters are present. Those that are present will have their corresponding bits set in the LOF word.

Consider the math function parameter, G0. It would be represented by a 16-bit code word suitable for setting up the devices that perform math functions, if any are to be performed, during a particular frame. MULT 1, MULT 2, ALU 1 and ALU 2 perform math functions. The host CPU 20, prior to down-loading a recipe into DVP-CPU RAM 119 would set the proper bits in the instructions comprising a recipe for setting up the multipliers and ALUs following occurrence of a video camera blanking pulse. In other words, the DVP-CPU would basically interpret and send the math function control instruction word to the registers associated with the multiplexers and ALUs as a code word which would set up the components in the DVP for doing what they are supposed to be doing when image data for a frame or frames is being processed. For instance, MULT 2 may not be required to do any multiplying during a particular period following a vertical blanking pulse in which case the math function code word would not need to be present. On the other hand, there may be a requirement that the pixel data be scaled by a selected constant factor K2 in MULT 2 in which case global parameter bit G8 would be set and there would be a 16-bit instruction code word for the K2 constant in the global parameter listing. DVP-CPU would, of course, interpret K2 word in its RAM 119 and deliver the corresponding instruction to the K2 register associated with MULT 2 to properly set it up for performing the multiplication step.

The math processor multiplexers would be similarly set up except that bit G1 in the LOF word would be set to indicate the presence of global parameter G1 for setting up the math MUXes 1, 2 and 3. Memory input MUXes 80 and 81 and frame memories FM 1 and FM 2 would be controlled by the G2 global parameter word. There components would be set up to bring about writing and reading FM 1 and FM 2 at the proper times and in accordance with whether the video camera target is being controlled through camera control 35 to read out in the progressive or interlaced scan mode. Global parameter words G3 and G4 in FIG. 2 would control the DVP input MUX 44 and output MUXes 59–61.

Global parameter word G5 is a 16-bit code word for controlling the video camera through camera control 35. This word has bits which may be set or not set to set up the video camera for the desired gain level and for progressive mode or interlaced mode scanning.

If the G6 bit in the LOF word is set it will indicate that there is a control word or global parameter G6 for the video disk recorder 67. The bits are set or not set in accordance with the manner in which the recorder is to perform. The code word G6 of which the bits are formed are, of course, interpreted and fed by way of bus 142 in FIG. 1 through the video disk interface 139 to the video disk recorder 67. These bits can start or stop the recorder or dictate to it to step to a new track, for example.

In FIG. 2, global parameter words G10–G13 have no functions assigned to them but their availability is suggestive of how easy it would be to control and obtain interaction between existing components and components which are not yet present in the DVP.

In FIG. 2, a 16-bit data flagword 140 is also shown as being part of a packet. If the DF bit in the opcode word 136 is set, it is indicative that data is being transferred with the packet from host CPU 20 to the DVP-CPU. Flagword 140 indicates the count of the data words that are to be transferred from CPU memory to DVP-CPU. The latter can count the data words to verify that the number is correct.

Global parameters G14 and G15 are designated as segment address and offset address parameters. These words just provide to the DVP-CPU the address of the data in the host CPU memory at which reading out of the data is to start. Of course, data, if any will be downloaded to the DVP-CPU before an x-ray procedure is initiated and at the time that the entire recipe for the procedure is downloaded from the host CPU to the DVP-CPU.

To further illustrate how the CPU components are reconfigured for every frame of image data in response to occurrence of the vertical blanking of the TV camera, the recipe for part of an x-ray procedure 135 in FIG. 3 will be described. The early part of this recipe brings about making an x-ray mask image or pre-injection image and storing the digital pixel data representative of the mask in frame memory 1. This is followed by making a first post-injection image and integrating three additional successive post-injection images with the first one and then subtracting the integrated sum from the mask image in FM 1. In FIG. 3, the topmost block is expanded to its right to show the details of a packet for configuring the DVP for obtaining input of the mask image to FM 1. The configuration (CONFIG) packet parameters are specified within the block 146. In block 146, the code words are expressed graphically rather than as digital words as would be the case in practice as was previously discussed in connection with FIG. 2. In FIG. 3 the opcode for CONFIG is expressed. It has associated with it bits that indicate whether global parameters are present and bits that indicate whether the x-ray source may be on or off at the moment. In any event, the bits G2, G3 and G5 in the LOF flag word are considered set in this simple. Looking back at FIG. 2 one will see that a code word for G2 is necessary because it relates to memory control and FM 1 will receive the mask image as input from the video camera and the input processor components which follow it. Global parameter G3 requires a code word because input MUX 80 is involved in multiplexing the image data from the input processor bus IP to FM 1. Global parameter code word G5 for camera control is required since again and interlaced or progressive scan mode of the camera must be chosen. Assume interlaced mode is selected. Frame memory 1 would then use a control word which had a bit for writing and reading out FM 1 in the interlaced mode. Assume there is no data associated with the CONFIG opcode so its bit DF would not be set. As previously indicated, the flange bits G2, G3 and G5 are set in the LOF flag word. Thus, there will be instruction words for G2, the memory input MUX and control; for G3, the input MUX 80 control; and, G5, for controlling the camera. In FIG. 3, line G2 in block 146 indicates memory control. A bit is set to indicate that writing in FM 1 is to be in the interlaced mode. Another bit is set to indicate that writing in FM 1 is to be in the interlaced mode. Another bit it set to basically cause writing in FM 1. Another bit is set to indicate that the input to FM 1 is from the video camera. Still another bit is set to prohibit writing in FM 2. The code word represented by line G2 in the block 146 of FIG. 3 is, of course, sent to the registers of the respective frame memories 1 and 2 and to the camera control so these components are set up or configured to function as indicated.

In block 146 there is also a code word for G3 that is interpreted by the DVP-CPU and sent to the input MUXes 80 and 81 to foreclose the image data from passing through MUX 81 but permit the data to pass through MUX 80 into FM 1.

In G5, the line that holds the camera control word has bits set for obtaining high camera gain and interlaced scan.

When the configuration represented by block 146 is executed, mask image data is stored in FM 1 during the first interval following a blanking pulse. The DVP-CPU responds to occurrence of the next video camera vertical blanking pulse by configuring the components of the DVP to input the data for the next x-ray image into FM 2 in the second from the topmost block in the recipe 135. The configuration data packet 147 in FIG. 3 for this configuration would be substantially the same as packet 146 except that the G2 word would have the appropriate bits set for causing the image pixel data to be sent to FM 2 as indicated in the second from the topmost block in the recipe 135. Of course, at the time that a bit is set to cause writing into FM 2, another bit is set to desirable writing into FM 1. At this time, there is a mask image in FM 1 and a subsequent image in which the x-ray opaque medium or iodinated dye may have already entered the blood vessels of interest.

Now the recipe contemplates obtaining three more images and integrating them with or adding them to the image data in FM 2 and then storing the sum in FM 2 before subtracting the mask image in FM 1 from the integrated image in FM 2. A DO-loop is used to iterate the input to FM 2 and store in FM 2 process. The DO-loop code is down-loaded with the instruction packet for performing a DO-loop. A DO-loop will preceed a configuration operation that is to be repeated a specified number of times. A DO-loop, unlike a configure command, occupies no frame time. It is just a marker that is entered for a repetitive operation. It does not contain parameters which are used to specify configurations. The DO-loop instruction is contained within the block marked 148 in FIG. 3. A DO-loop uses local parameters. It has a particular opcode as indicated in the first line of block 148. In this case one bit in the local parameter field associated with the opcode is set to indicate that the number of times that the DO-loop is to be repeated is specified in the DO-loop local parameter listing. As shown in block 148, in this particular example, the parameter, L0, specifies that the DO-loop is to be repeated three times. Of course, in a commercial embodiment wherein 16-bit instruction words are permissible, a DO-loop could be repeated over 65,000 times if desired and yet the DO-loop instruction only has to be down-loaded once in a packet. Moreover, many packets with DO-loops may be included in the same recipe which is loaded in the DVP-CPU at one time.

As shown in the recipe 135 in FIG. 2, after the first DO-loop is encountered, reconfiguration of the components of the DVP must be executed. The configuration applicable to the DO-loop is set forth in the block marked 149. In this example, the input from the camera through the input processor is to be added to FM 2 and is to be written back into FM 1. This requires considering the math functions to provide the proper instructions. Since there is a math process involved the proper code word for the math function global parameter G0 in FIG. 2 must be considered. Moreover, with a math function consideration will have to be given to control of MUXes 2 and 3 going into the math processor so a code word for local parameter G1 for the math MUXes must be inserted. Since there will be reading and writing in the frame memories FM 1 and FM 2, a global parameter code word for G2 will be required. G3 is used because input MUXes 80 and 81 are involved. In this example, output MUX is not involved so there need be no G4 global parameter. Video camera control is required so a code word for global parameter G5 must be inserted. Since there is to be no scaling of the image data in this particular example the code words for G7 and G8 are selected which have bits set for producing no scaling, that is, for negating any multiplication by constants K1 or K2. Even though there is no scaling, the first ALU 1 is being used as an adder and the data by definition must flow through the multipliers MULT 1 and MULT 2 so the code words for G7 and G8 global parameters will be those that produce a multiplication by 1 which is tantamount to simply having the data pass through the multipliers.

Referring to block 149 in FIG. 3, one will see in the top line that the opcode for CONFIG is specified along with global parameters in the instruction field. The opcode will, of course, be the same as the opcode for CONFIG in line 1 of block 136. In the second line of block 149, the link operand field, LOF, specifies the global functions used and these have already been mentioned.

The math function is the first global parameter G0. A code word will be selected that has bits set for adding the input image data to the image data in FM 2 in ALU 1 and storing the result in FM 2. Since it is desired to pass the input image data directly out of FM 2 a bit must be set in the G0 global parameter that will result in the image data passing directly through ALU 2. The function of adding the input image to that in FM 2 in ALU 1 is indicated graphically in the G0 line of block 149 although, as in the other cases, any function would be expressed in digital word bits. The same is true for the bits in line G0 for passing through ALU 2.

A math MUX global parameter, G1, is also involved. The frame data addition is to be done in ALU 1 so MUX 2 must be set up to bring in the data from FM 2 so a bit is set in the G1 parameter for doing that. In fact, for the sake of brevity, it may be noted in the G1 instruction that a code word is selected that will cause MUX 2 to bring in the data from FM 2, brings in the live image data through MUX 3 to ALU 1 and negates MUX 1.

For the global parameter governing memory input MUX and control, G2, a code word will be used that will inhibit or not write in FM 1, will output the math processor, MP, to FM 2, will specify interlaced output and input for FM 2, and will cause writing of the live image data in FM 2.

For the input MUX 44 global parameter G3 is relevant. The code word for G3 will be one that specifies that MUX 44 will transfer data from ADC 42 into the DVP.

The camera control global parameter G5 will be a word that specifies that the camera is controlled to produce high gain, is unblanked and operating in the interlaced mode. As indicated earlier, for the global parameters G7 and G8 related to constants K1 and K2, instruction words will be chosen that result in these constants being equal to 1 so that the data will not be scaled in either of the multipliers 1 or 2.

When the DO-loop has been iterated three times, it responds to the opcode for ending the DO. Then, as shown in the recipe 135, the DVP-CPU effectuates a new configuration for subtracting the mask image in FM 1 from the integrated or summed image in FM 2 and transfers the difference image data to the video disk recorder 67.

From the description given thus far it will be evident to those skilled in the art below how the remainder of the recipe 135 in FIG. 3 can be executed. It should be remembered that the whole recipe has been down-loaded into the DVP-CPU RAM 119 before the procedure is stated. All of the instruction words for the configurations and DO-loops are available to the DVP-CPU during the procedure. The DVP-CPU simply has to interpret the code word and set up the registers of the various components in the DVP for the components to execute their functions in the proper sequence.

There can be more configuration commands interposed between a DO and an END DO in addition to the single configuration command that has been described above. In fact, there can be DO-loops surrounding DO-loops to obtain any amount of iteration for different configurations. It is important to note, however, that every configuration is synchronized with occurrence of the rising edge of the video camera vertical sync and blanking pulse. In an actual embodiment, provision is made for downloading as many as 500 instruction words into the DVP-CPU RAM 119. With the use of DO-loops, however, the rear number of actual instructions that can be executed can reach more than 65,000. As previously mentioned, it is important to note that the DVP-CPU does not have to address ROM to obtain an instruction for setting up the registers associated with the various components in the DVP. The DVP-CPU, in effect, just reads out the instructions in sequence and transfers them to the various registers during a configuration.

In the opcode configuration line in block 149 of FIG. 3 some x-ray on or off bits are implied. This was inserted to exemplify that the instruction can be coded so that no matter what the x-ray unit is doing a configuration may be executed. In some cases, it may be desirable to negate input of image data through the DVP unless the x-ray tube has been previously turned on. For instance, the host CPU may have instructed the x-ray control to turn on the x-ray tube in response to the operator operating hand switch 28. It is necessary for the rotor of the x-ray tube to come up to speed and the power to the x-ray tube should not be turned on until there is a zero crossing of the power line frequency to cut down on surge. So along with vertical blank synchronization, there is also x-ray on synchronization so that the configuration can be held off and not executed until x-rays have actually been generated. This x-ray synchronization signal is actually an interrupt that is fed to interrupt input 121 of the DVP-CPU 115 in FIG. 1.

An important feature of the recipe 135, in FIG. 3 is inclusion of one or more pause instructions, one such instruction is shown in the second block from the top in the recipe 135. The pause instructions indicate to system controller host CPU 20 that execution of the recipe has been stopped intentionally at this point. A typical case is illustrated in FIG. 3 where the first thing to happen is to configure and input a mask in FM 1. The operator should display the mask to mask sure it is satisfactory. If it is not, another mask can be obtained. The system controller 115 responds to an operator input by way of user interface 22 by obtaining another mask. In the alternative, the system controller will respond to another operator input by restarting execution of the recipe.

In summary, a method and means have been illustrated for configuring hardware in a universal and unrestrictive fashion by referencing or keying off of important timing signals such as the camera vertical blanking signal and the x-ray synchronization signal. In other words, a universal control concept has been disclosed which is applicable to television image processor control problems based on a frame-by-frame marker interpretation of instructions. Programmability is extremely flexible. The DVP-CPU does not require a stored program because any recipe or procedure is downloaded into the CPU RAM well in advance of its execution in the DVP. The RAM is always clear to receive new information for doing an essentially unlimited variety of procedures because the host CPU can be programmed to provide an unlimited number of instructions. Data for an unlimited number of recipes only has to be stored on floppy disk 21 associated with host CPU 20. There is no limit on the number of disks that could be used to provide different procedures. This is in marked contrast with customary methods where the DVP-CPU would read instructions from ROM. In such case, every time a new diagnostic procedure was conceived, the ROM chips would have to be exchanged or reprogrammed.

Those skilled in the art will appreciate that the DVP can be configured to perform many functions in addition to the integration procedure briefly described above. For instance, after the integrated frames have been subtracted from the mask image, and stored in FM 2, the components in the DVP may be configured to feed the pixel data from the output of FM 2 over bus 56 to the input of that bus to any one of the MUXes 59, 60 or 61 to variously record the integrated subtraction image in disk recorder 67 or display it on one of the TV monitors such as the one marked 70. Additional diagnostic procedures which the digital video processor can perform using the synchronized configuration method described herein may be seen in the previously filed copending application of Keyes, et al Ser. No. 271,314, filed June 8, 1981, now U.S. Pat. No. 4,393,402 issued on July 12, 1983 and assigned to the assignee of this application.

Although the structural and functional features related to controlling a digital video processor have been described in sufficient detail to enable those skilled in the art to practice the invention, such description is intended to be illustrative rather than limiting, for the invention may be variously employed and is to be limited only by interpreting the claims which follow.

We claim:

1. A method of controlling in real time a digital video processor (DVP) having hardwired data busses and functional components including any of multiplexers, multipliers, memories, look-up tables and arithmetic logic units, interconnected by said busses which components are conditioned to operate in a particular mode in response to being provided, respectively, with instruction code words that determine the input data to the component, said data busses being variously selected to effectuate data paths to any of said components for processing in any conditioned component digital pixel data representative of x-ray image frames obtained with a video camera in an x-ray fluorography system, host central processing unit (host CPU) and memory means for storing digital code instructions for defining a plurality of x-ray image acquisition and image processing procedures, and user interface means for requesting said host CPU to effect performance of any of the defined procedures, said method comprising:

down-loading from said host CPU to a digital memory coupled to a digital video processor-central processing unit (DVP-CPU) prior to the time a procedure is to be performed, a list of instruction words (a recipe) for effecting performance of an entire processing procedure under the control of said DVP-CPU, said recipe including a sequence of configuration command packets of digital words corresponding to instruction code words by which said functional components are commanded to process data transmitted on said data busses, providing interrupts to said DVP-CPU coincident with the occurrence of the vertical blanking intervals for the frames of said video camera, said DVP-CPU responding to each interrupt by causing said instruction code words in a packet to be provided selectively to said functional components during the current blanking interval between frame times to condition said components to operate in the instructed mode when the data is transmitted.

2. The method set forth in claim 1 including the step of causing a processing procedure that is defined by instructions in one configuration packet for one television frame time to be repeated for a predetermined number of frame times by including in said recipe before a packet an instruction to which said DVP-CPU responds by executing a DO-loop and including an instruction after one or more packets to which said DVP-CPU responds by ending the DO-loop.

3. The method set forth in claim 1 wherein said recipe contains a pause instruction for signalling the host CPU that execution of the recipe has been stopped, said host CPU responding to an operator input by restarting execution of the recipe.

4. The method set forth in claim 1 including the step of coordinating recipe execution with x-ray on or off states such as to suspend or alternately restart execution of the recipe upon occurrence of a nonsynchronous external event.

* * * * *